United States Patent [19]

Nishizawa et al.

[11] Patent Number: 5,005,249
[45] Date of Patent: Apr. 9, 1991

[54] VEHICLE WINDSHIELD WIPER

[75] Inventors: Kazunori Nishizawa, Kosai; Mitsutaka Abe, Aichi; Hiroshi Matsumoto, Hamamatsu; Shinji Imamura, Kosai, all of Japan

[73] Assignee: Asmo Co., Ltd., Kosai, Japan

[21] Appl. No.: 322,509

[22] Filed: Mar. 13, 1989

[30] Foreign Application Priority Data

Apr. 1, 1988 [JP] Japan .................................. 63-81918

[51] Int. Cl.$^5$ .............................................. A47L 1/02
[52] U.S. Cl. ............................. 15/250.27; 15/250.29; 15/250.3
[58] Field of Search ........... 15/250.27, 250.13, 250.14, 15/250.21, 250.27, 250.30

[56] References Cited

U.S. PATENT DOCUMENTS

| 3,336,619 | 8/1967 | Hoyler | 15/250.14 |
| 3,422,480 | 1/1909 | Kato | 15/250.27 X |
| 4,584,734 | 4/1986 | Leroy et al. | 15/250.34 X |
| 4,672,709 | 6/1987 | Licata et al. | 15/250.27 |

FOREIGN PATENT DOCUMENTS

| 2306127 | 8/1974 | Fed. Rep. of Germany | 15/250.27 |
| 943038 | 7/1982 | U.S.S.R. | 15/250.27 |
| 910501 | 11/1962 | United Kingdom | 15/250.14 |

Primary Examiner—Frankie L. Stinson
Attorney, Agent, or Firm—Burns, Doane, Swecker & Mathis

[57] ABSTRACT

A vehicle windshield wiper comprises; a driving rod which is reciprocated by crank-coupling with a wiper motor, a double arm lever reciprocally swung around a pivot shaft by the driving rod, a driving-side wiper blade which is swung by fixing in the pivot shaft, a driving-side lever which is fixedly secured in a downward extending portion of the pivot shaft, a coupling rod rotatably coupled with the driving-side lever, and a driven-side lever which is swung by reciprocation of the coupling rod and swings a driven-side wiper blade.

4 Claims, 4 Drawing Sheets

VEHICLE WINDSHIELD WIPER

BACKGROUND OF THE INVENTION

The present invention relates to a vehicle windshield wiper whose wiper link mechanism is improved so that a windshield can be wide wiped.

Lately, a safe and comfortable driving is required of a vehicle. Therefore, the vehicle is designed like a slant of nose, and a bonnet and a dashboard are fixed below not to appear in a driver's vision area, resulting in a good view and a wider area of the windshield. Thus, a windshield wiper also should be desirably useful in a safe driving by wiping not only a wipe area provided by the regulation for wipe area, but also an area between a lower view provided by the reglation and a bonnet.

Conventionally, the Japanese utility model open publication No. '86-153658 discloses a vehicle windshield wiper wherein a first wiper blade on the driver's side and a' second wiper blade on the passenger's side are coupled with a driving power via a link mechanism to wipe a front windshield. By the link mechanism, the second wiper is adapted to be displaced from passenger's side edge to lower edge on the driver's side at a twice speed of the first wiper blade. This vehicle windshield wiper uses the link mechanism of a tandem drive system wherein two linear swinging levers are coupled by a coupling rod. However, in case of using of the conventional system for wipe angle of 180°, undesirably the swinging lever on the passenger's side is short and the link mechanism is so loaded that a vehicle body is not deemed as a rigid body. To widen a swinging angle, the use of a double arm lever is proposed as disclosed in the German patent No. 1164858. However, in a conventional double arm lever, a shaft is provided in either one of two arms composing the double arm lever and a coupling rod is coupled with the shaft. Therefore, the interference occurs between the arm and the coupling rod, resulting in limitation of a fully wide angle for wider wiping. Furthermore, because a driving-side wiper blade and a driven-side wiper blade are reversely swung at the same time, the both wiper blades interfere with each other, so a windshield cannot receive a wide wipe angle to a lower edge thereof.

U.S Pat. No. 4672709 discloses a drive for a tandem wiper system wherein a driver's primary vision area is double wiped by a motor 64. The drive for the windshield wiper system includes a driver's side transmission and a passenger's side transmission. An axis 38 of a tower 36 in the transmission 32 is swung by the motor 64 via a crank arm 68, a drive link 70, a ground link 52, a connecting link 60 and an elongated drive plate 44. Because the tower 36 and the ground link 52 interfere with each other, a windshield is not wide wiped by a passenger's side wiper blade. As a result thereof, a driver's side windshield cannot be wiped to a lower view being a lower edge 14.

SUMMARY OF THE INVENTION

An object of the present invention is to provide a vehicle windshield wiper which allows a driver's side windshield to receive a double wipe by a driven-side and a driving-side wiper blade.

Another object of the present invention is to provide the vehicle windshield wiper which allows the driving-side wiper blade to be swung by a wide wipe angle to a low edge of windshield without interference with the driven-side wiper blade.

A further object of the present invention is to provide the vehicle windshield wiper which allows a double arm lever and a driving-side lever fixedly provided in a pivot shaft to be swung by a wide wipe angle without interference between the driving-side lever, the arms and the pivot shafts.

Another further object of the present invention is to provide the vehicle windshield wiper which allows the driven-side lever to shake off wiped water drops thereon.

The vehicle windshield wiper of the present invention comprises a driving rod which is reciprocated by crank-coupling with a wiper motor, a double arm lever reciprocally swung around the pivot shaft by the driving rod, the driving-side wiper blade which is swung by fixing in the pivot shaft, a driving-side lever which is fixedly secured in a downward extending portion of the pivot shaft, a coupling rod rotatably coupled with the driving-side lever, and the driven-side lever which is swung by reciprocation of the coupling rod and swings the driven-side wiper blade.

According to this structure, the driving-side lever fixed in the extending portion of the pivot shaft is turned freely without interference with the arm and the pivot shaft of the double arm lever. Therefore, the pivot shaft of said driving-side lever and the double arm lever can be actuated at a wide wipe angle required to wipe a windshield to a lower edge and the interference does not occur between the double arm lever and the coupling rod. Conventionally, a double arm lever is used to widen an angular velocity of a wiper blade. In the present invention, the double arm lever is used so that the driving-side lever can be swung in a range of wide wipe angle, based on the idea that a wipe angle is wide in a unit time as an angular velocity is wide.

Another vehicle windshield wiper of the present invention is characterized in that the driving-side lever of said double arm lever can be swung by an angle beyond a straight line connecting a center of the pivot shaft of said double arm lever and a connecting point between the driven-side lever and the coupling rod where the driven-side lever comes to a maximum angle position on an open side thereof, wherein the driven-side wiper blade is reversely swung and minutely returns such that the same substantially stops at a moment in the maximum angle position on the open side when the driving-side lever is located above and below the straight line, and the driven-side wiper blade returns late after the driving-side wiper blade.

According to this structure, the interference can be eliminated between the driven-side and the driving-side wiper blades, because the driven-side wiper blade interlocked with the driving-side lever is stopped once near a window frame on the open side of the front windshield as the driving lever is swung by an angle beyond the line and the driving-side wiper blade which is swung on the open side of a lower edge of the front windshield can be reversely swung on the closed side during stoppage of the driven-side wiper blade.

Moreover, according to this structure, a driver's side windshield can be wiped to a driver's lower view because the driving-side wiper blade wipes the front windshield to the lower edge thereof. Also, because the driven-side lever is slightly vibrated on the open side, water drops on the driven-side lever can be shaken off. Furthermore, the same area of windshield is double wiped by the driving-side and the driven-side wiper blade, therefore a driver's vision area of windshield receives a double wipe, resulting in a good view of a driver's vision area.

The above and further objects and novel features of the invention will more fully appear from the following detailed description when the same is read in connection with the accompanying drawing. It is to be expressly understood, however, that the drawing is for purpose of illustration only and is not intended as a definition of the limits of the invention.

DETAILED DESCRIPTION OF PREFERRED EMBODIMENT

Figure 1:
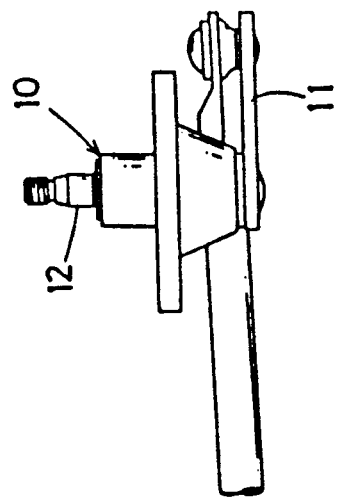
FIG. 1(a) and (b) are a front view and a lower view of a wiper of a first embodiment of the present invention.
Figure 1:
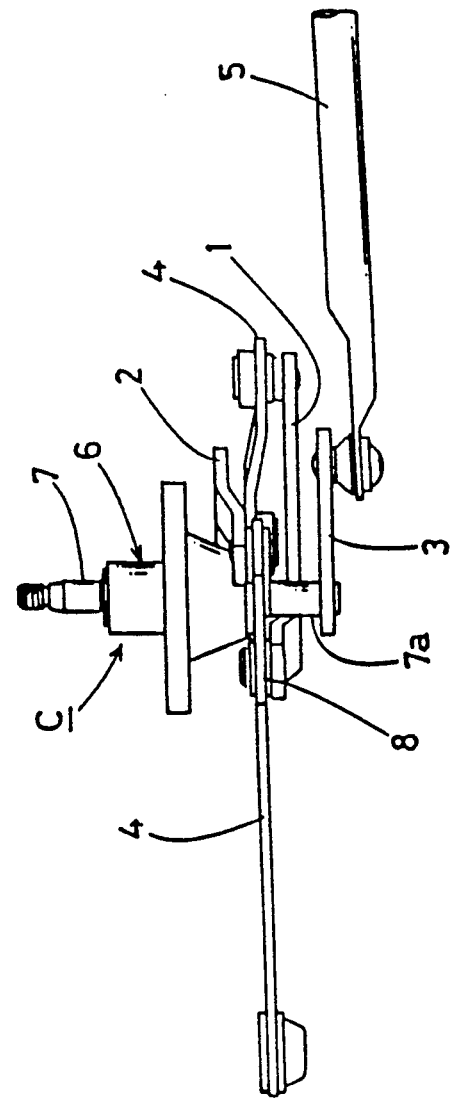

Referring now to the FIG. 1(a) and (b), there is shown therein a structure of the present invention in a first embodiment.

Figure 2:
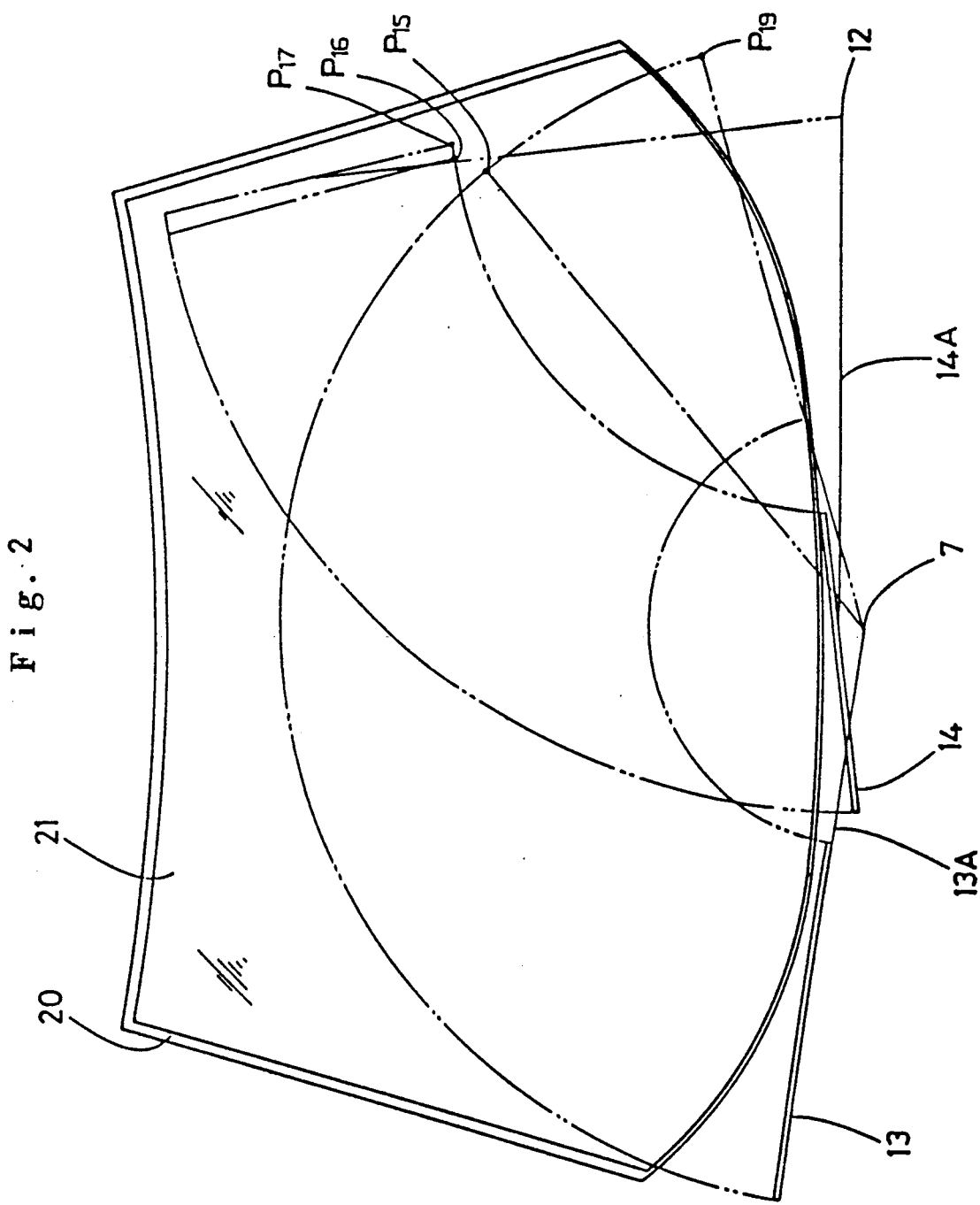
FIG. 2 is a front view illustrating a wiping pattern by the wiper of the first embodiment.
Figure 3:
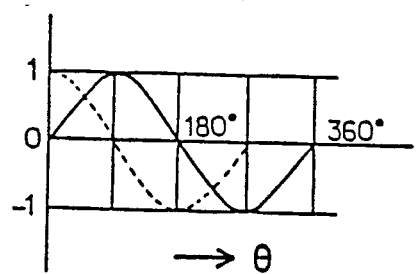
FIG. 3 is a characteristic view of a sine curve for explanation of an actuation of the first embodiment.

In a vehicle windshield wiper of the present embodiment, a crank arm 9 is fixed in a wiper motor rotary shaft 9a and arms 1 and 2 are rotatably coupled with the crank arm 9, via a driving rod 4 which is rotatably coupled with said crank arm 9 to be reciprocated. The arm 1 is a plate member forming substantially a letter of L, whereby an end of the rod 4 is connected to an end of a butterfly lever 8 by the arm 1. The arm 2 is a plate member forming substantially a letter of L, whereby the other end of the butterfly lever 8 is coupled with a middle portion of the rod 4 by the arm 2. The butterfly lever 8 is fixed at the center thereof in a downward extending portion 7a of a driving-side pivot shaft 7. A double arm lever C is composed of the arms 1 and 2 and the butterfly lever 8. The pivot shaft 7 is rotatably held in a wiper bearing member 6. A driving-side lever 3 is fixedly provided in the downward extending portion 7a of the pivot shaft 7. An end of a coupling rod 5 is rotatably coupled with a free end of the lever 3. The other end of the rod 5 is rotatably coupled with a free end of a driven-side lever 11. The driven-side lever 11 is fixedly provided in a lower end of a driven-side pivot shaft 12. The pivot shaft 12 is rotatably held in a wiper bearing member 10. The both wiper bearing members 6 and 10 are fixed in a vehicle body (not illustrated). As illustrated in FIG. 2, a driving-side wiper blade 13 and a driven-side wiper blade 14 are coupled respectively with the pivot shafts 7 and 12 via wiper arms 13A and 14A. In a pattern for wiping a windshield being illustrated in FIG. 2, a substantially square frame shows a window frame 20 which encloses the outside of the front windshield 21.

Figure 1B:
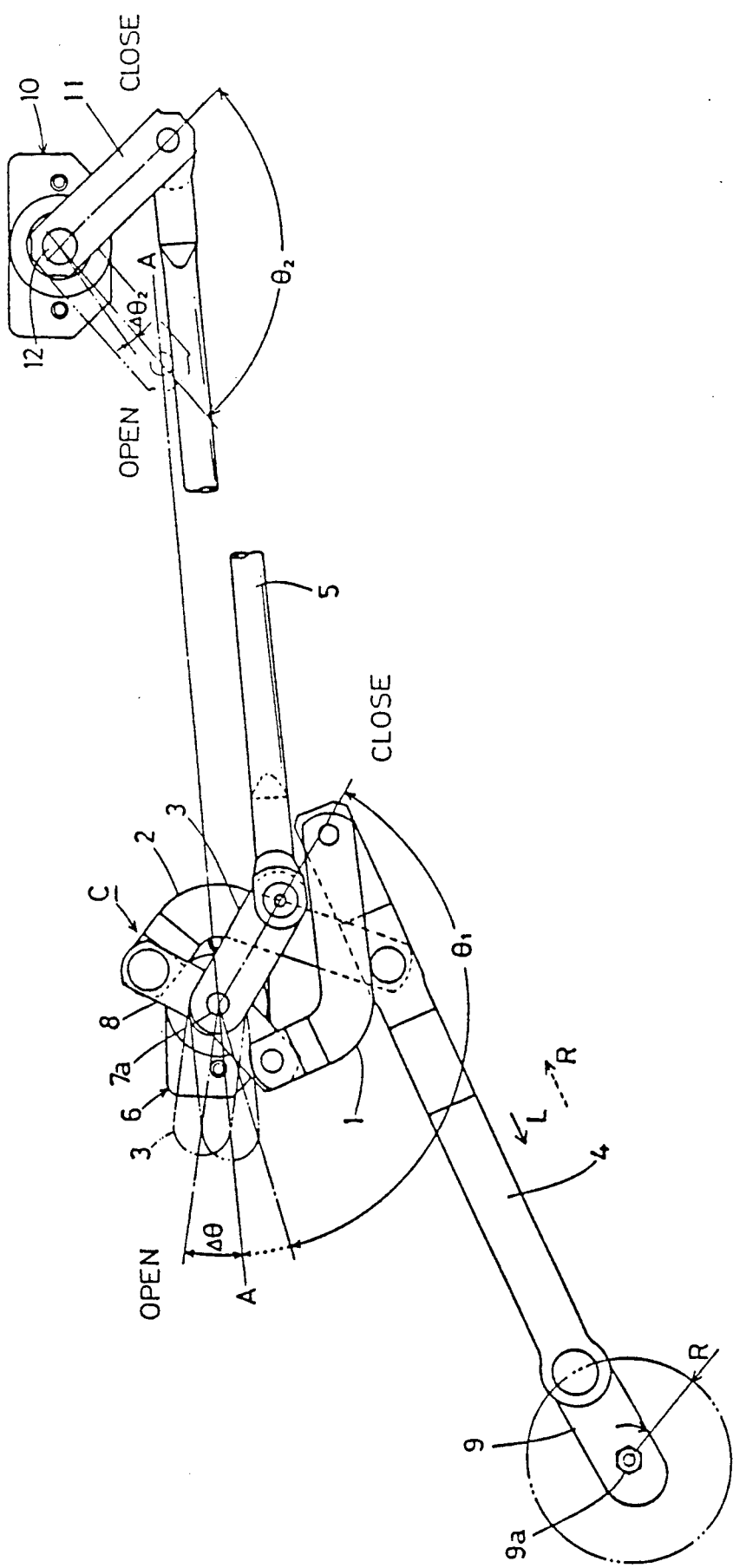

The following is a description of actuation. When the driving-side lever 3 is located on a solid line and the crank arm 9 and the rod 4 are lined on a straight line, as illustrated in FIG. 1(a) and FIG. 1(b), the wiper blade 13 is located below the window frame 20, as illustrated by a solid line in FIG. 2. The wiper blade 14 which is actuated With the driven-side lever 11 is also located below the window frame 20. When the rod 4 is drawn toward the left, like an arrow L in FIG. 1(b), by rotation of the crank arm 9, the two arms 1 and 2 and the butterfly lever 8 are swung clockwise with the pivot shaft 7. Then the driving-side lever 3 is rotated by an angle $\theta_1$ to or just before a line A—A with rotation of the pivot shaft 7, as illustrated in FIG. 1(b), and the rod 5 is displaced toward the left in FIG. 1(b), causing the driven-side lever 11 to be rotated by an angle $\theta_2$. An angular velocity of the double arm lever C is so big, that the angle $\theta_1$ can be made larger than the angle $\theta_2$ within the same time. The driving-side lever 3 is provided in the downward extending portion 7a of the pivot shaft 7 to avoid interference with the both arms 1 and 2. This eliminates interference of the coupling rod 5 with the arms 1 and 2 and the pivot shaft 7, even if the rotary angle $\theta_1$ of the driving-side lever 3 is 135° to 150°. When the driving-side lever 3 is rotated by the angle $\theta_1$, the blade 13 is swung to a point $P_{15}$, as illustrated in FIG. 2. Meanwhile, the driven-side lever 11 is rotated by the angle $\theta_2$ of 85° to 95° and the blade 14 is swung to a point $P_{17}$. Then, the blade 13 is reversely swung at the point $P_{15}$ and the blade 14 is reversely swung later than the blade 13 due to the characteristics of a sine curve wherein an angular velocity is varied by a swinging angle. As a result thereof, the wipe of windshield continues without interference between the blade 13 and 14.

(Second Embodiment)

A structure of the present invention in a second embodiment is also explained in accordance with FIG. 1(b). As illustrated in FIG. 1(b), the driving-side lever 3 is fixed in the downward extending portion 7a of the pivot shaft 7, so that said lever 3 can be swung by another narrow angle $\Delta\theta$ for an open side after swung by the angle $\theta_1$ in case of wiping a lower view ($P_{15}$ to $P_{19}$). As explained in the first embodiment, the method for fixing the driving-side lever 3 in the downward extending portion 7a of the pivot shaft 7 caulking, screwing, brazing and welding. The narrow angle $\Delta\theta$ is an angle widening for the open side beyond the line A—A connecting a connecting point between the center of the pivot shaft 7 and the coupling rod 5 located where the driven-side lever 11 comes to the maximum angle position on the open side. When the driven-side lever 11 is located at the maximum angle on the open side, the lever 11 is reversely swung because the driving-side lever 3 pass the line A—A. However, said angle $\Delta\theta$ is so narrow that the lever 11 can be substantially stopped once. In the present embodiment, the narrow angle $\Delta\theta$ ranges from 5° to 20°.

Figure 4:
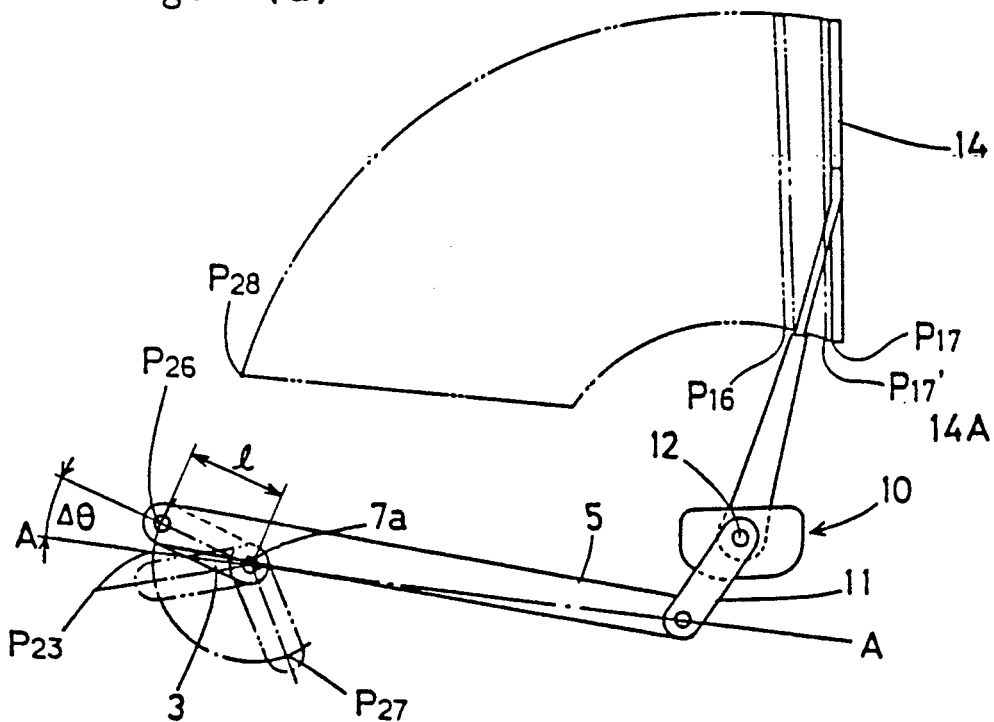
FIG. 4(a) and (b) are a front view and an actuation diagram typically illustrating an actuation of a driven-side wiper blade of a second embodiment with relation to a driven-side lever.
Figure 4:
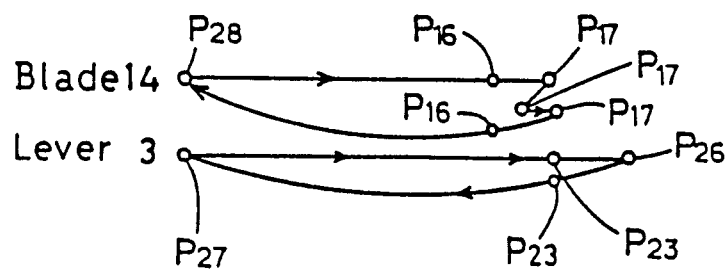

The following is a description of actuation of the second embodiment in accordance with FIG. 4(a) and FIG. 4 (b). In case of the link mechanism of the first embodiment, the driving-side lever 3 is reversely swung on or below the line A—A at the open side in FIG. 4(a). Therefore, the driven-side lever 11 returns to its original position directly from a returning point. Meanwhile, in the second embodiment, as the driving lever 3 having a length of l is swung by the angle $\Delta\theta$ above the line A—A, a projected length l—l $\cos(\Delta\theta)$ of the driving-side lever 3 shortens above the line A—A. Therefore, the driven-side lever 11 tries to return toward a point $P_{17}'$ as the rod 5 returns toward the left in FIG. 4(a). Also, when the driving-side lever 3 is swung by the angle $\Delta\theta$ downward from a returning point $P_{26}$ to return to the line A—A, said projected length 1—1 cos(Δθ) lengthens and the rod 5 is displaced toward the right. Therefore, the driven-side lever 11 is actuated to a point $P_{17}$ being a returning point again and tries to be actuated if it is slightly vibrated. If the angle Δθ ranges from 5° to 20°, the blade 14 is stopped once at the point $P_{17}$ being a returning point as the movement of the driven-side lever 11 on the open side is transmitted to said blade 14 via the wiper arm 14A. This results from failure of a transmission of the force caused by a play of a wiper motor being an electric motor with reduction gear, a freedom degree of connection parts between the levers 1, 2 and 3 and the rods 4 and 5, limitation of rigidity in a vehicle body and a freedom degree of connection part between the wiper arm 14A and the driven-side lever 11. Even if the blade 14 may be reversely swung slightly, it hardly interrupts the view for driving. Thereby, the blade 14 is substantially stopped at the point $P_{17}$. When the blade 14 is substantially stopped once, it is vibrated, thereby allowing water drops on the blade 14 to be shaken off. Because the blade 14 is substantially stopped at the returning point as indicated above, the blade 13 passes the point $P_{15}$ later than the blade 14 passes the point $P_{16}$ and is reversely swung at the point $P_{19}$. This enables enough space between the point $P_{15}$ and $P_{16}$ when the blade 13 passes the point $P_{15}$ so as to be closed.

Referring to FIG. 4(a) and FIG. 4(b), the above actuation is explained again. When the driving-side lever 3 is located at a point $P_{23}$ on the line A—A, the driven-side blade on the driver's side is located at the point $P_{17}$. When the driving side lever 3 is swung beyond the line A—A by the narrow angle Δθ and reaches a point $P_{26}$, the driven-side blade 14 tries to move to return for a point $P_{17}'$. While the driving-side lever 3 is reversely from the point $P_{26}$ for the point $P_{23}$, the blade 14 tries to move to return to the point $P_{17}$ from the point $P_{17}'$. Namely, while the driving-side lever 3 is swung by the narrow angle Δθ between the point $P_{23}$ and $P_{26}$, the blade 14 is actuated as if it were swung near the point $P_{17}$. However, if the narrow angle Δθ ranges from 5° to 20°, the blade 14 is substantially stopped at the point $P_{17}$. If the narrow angle Δθ exceeds 20°, the blade 14 is reversely swung without temporary stop and unfavorably appears in a driver's view. When the driving-side lever 3 is swung for a point $P_{27}$ beyond the point $P_{23}$, the blade 14 returns at the point $P_{16}$ and moves continuously toward the point $P_{28}$. Before the blade 14 returns to the point $P_{16}$, the driving-side blade 13 on the front windshield of a driver's assistant is interlocked with the driving-side lever 3 and passes the point $P_{15}$ as illustrated in FIG. 2, thereby allowing enough space between $P_{16}$ and $P_{15}$.

The present invention is not limited by the above embodiments. For example, the narrow angle Δθ of 5° to 20° can be replaced with other angles.

While a preferred embodiment of the invention has been described using specific terms, such description is for illustrative purposes only, and it is to be understood that changes and variations may be made without departing from the spirit or scope of the following claims.

What is claimed is:

1. A vehicle windshield wiper comprising:
   a driving rod which is reciprocated by crank-coupling with a wiper motor,
   a double arm lever reciprocally swung with a pivot shaft by the driving rod,
   a driving-side wiper blade which is swung by fixing in the pivot shaft,
   a driving-side lever which is fixedly secured in the pivot shaft,
   a coupling rod rotatably coupled with the driving-side lever, and
   a driven-side lever which is swung by reciprocation of the coupling rod and swings the driven-side wiper blade,
   whereby the driving-side lever of said double arm lever can be swung by an angle beyond a straight line connecting a center of the pivot shaft of said double arm lever and a connecting point between the driven-side lever and the coupling rod, where the driven-side lever comes to a maximum angle position on an open side thereof, wherein the driven-side wiper blade is reversely swung and minutely returns in the maximum angle position on the open side when the driving-side lever is located above and below the straight line, and the driven-side wiper blade returns after the driving-side wiper blade.

2. The vehicle windshield wiper as claimed in claim 1, wherein 5° to 20° is the angle beyond the straight line connecting the center of the pivot shaft of the double-arm lever and the connecting point between the driven-side lever and the coupling rod, the driven-side lever moving to the maximum angle position on the open side.

3. The vehicle windshield wiper as claimed in claim 1, wherein the driving-side lever is fixedly secured in a downward extending portion of the pivot shaft so as to swing with the pivot shaft.

4. The vehicle windshield wiper as claimed in claim 1, wherein the driven-side lever is longer than the driving-side lever.

* * * * *